Sept. 13, 1938.                A. W. BARBER                2,129,727
                              COUPLING SYSTEM
                           Filed Jan. 21, 1937
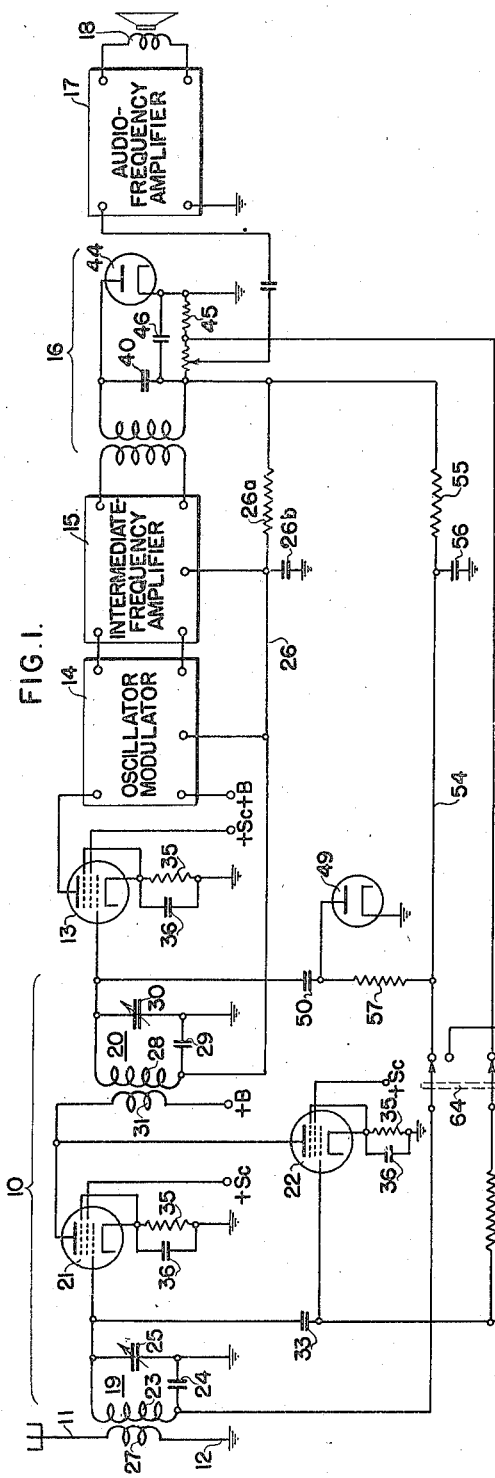
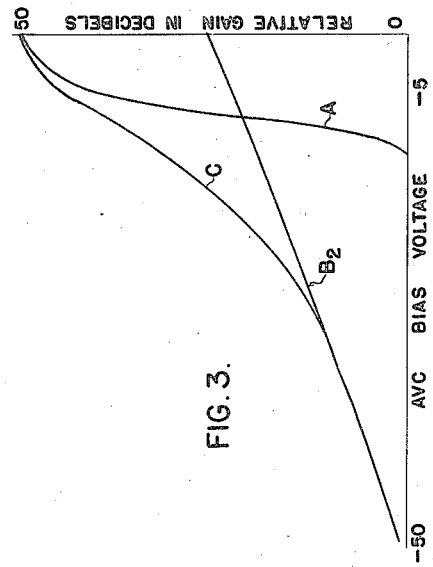
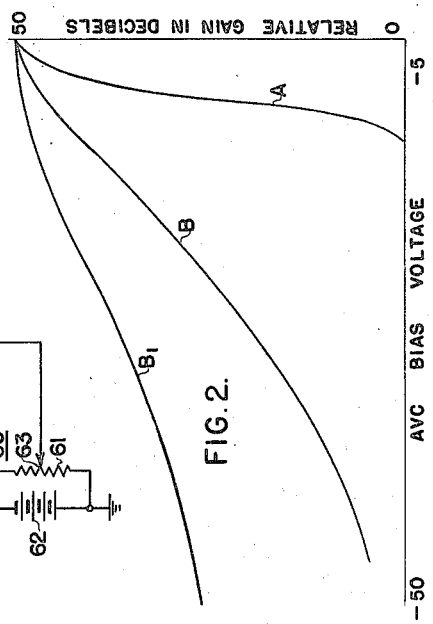
INVENTOR
ALFRED W. BARBER
BY Laurence B. Dodds
ATTORNEY Patented Sept. 13, 1938

2,129,727

UNITED STATES PATENT OFFICE 2,129,727

COUPLING SYSTEM

Alfred W. Barber, Flushing, N. Y., assignor to Hazeltine Corporation, a corporation of Delaware Application January 21, 1937, Serial No. 121,422

12 Claims. (Cl. 250—20)

This invention relates to modulated-carrier signal-translating systems, and more particularly to adjustable coupling arrangements for use in such systems.

In its broader aspects the invention is directed to coupling systems generally and to the provision of means for providing a coupling adjustable for any desired purpose. The invention, however, is specifically concerned with antenna coupling systems and with the provision of means for automatically controlling the gain of such systems in accordance with the amplitude of received signals.

In a modulated-carrier signal-receiving system, in order to obtain satisfactory reproduction of relatively weak received signals, such as signals from distant stations, it is highly desirable that the antenna circuit be coupled to the usual first vacuum-tube amplifier of the system by a coupling system which provides a high gain, so that a maximum signal-to-noise ratio may be obtained at the input circuit of the first amplifier. It may be stated that the limit of the useful sensitivity of a receiver is primarily dependent upon the circuit noise in the circuits preceding the first amplifier tube, and, in some cases, also within the tube itself. These internal noises are of a fixed amplitude and, while they are inappreciable, with respect to relatively strong signals, they may be of the same order of magnitude as weak signals.

If such an antenna coupling system is arranged to provide a high gain, in order to provide a relatively high signal-to-noise ratio for weak signals, then, when relatively strong signals are received, such as signals from nearby stations, these signals will be impressed on the input circuit of the first amplifier at such high amplitudes as to effect overloading of the amplifier, causing distortion, whistles, and cross-modulation between desired and undesired signals. It is desirable, therefore, that the gain of an antenna coupling system be high for the reception of relatively weak signals and reduced for the reception of relatively strong signals, to the end that the amplitude of the signal input to the first amplifier may be maintained at approximately optimum value for received signals of all amplitudes.

Moreover, due to the well-known phenomenon of fading, the amplitude of any particular signal being received may vary over an extremely wide range, that is, from a very low to a relatively high value, at times with great rapidity. Compensation for this condition by adjustment of the antenna gain, therefore, requires an extremely rapid control which is dependent on, and immediately responsive to, the amplitude of the signals being received.

In general, it is an object of the present invention to provide an improved coupling system embodying means for providing an adjustable coupling which is adapted for use in any desired signal-translating system for transmitting signals varying over a wide range of amplitudes.

More particularly, it is an object of the invention to provide an improved adjustable antenna coupling system provided with means for controlling the gain thereof in accordance with received signal conditions to permit the range of signal input amplitudes which may be satisfactorily received to be extended to include both extremely weak and extremely strong signals.

In accordance with the present invention, there is provided, in a signal-translating system, a coupling system which includes input and output circuits and at least two parallel signal-repeating paths coupling the circuits. One of these paths has a relatively steep bias-transmission efficiency characteristic which is substantially non-linear for biases in excess of a predetermined value, while the other path has a repeating characteristic which is substantially linear for all operating conditions. Means are provided for adjustably biasing these paths to vary their transmission efficiencies, the bias applied to the path having the relatively steep characteristic extending over a range including the predetermined value. The second path has a repeating ratio substantially greater than that of the first-mentioned path when it is biased in the vicinity of, or greater than, said predetermined value and substantially less than that of the first-mentioned path when it is biased to relatively low values. The paths may include provisions such that the signal input to the path having the relatively steep transmission characteristic is substantially greater than that to the other of the paths, in which case only the path having the relatively steep characteristic need be adjustably biased.

With such an arrangement, relatively weak signals are transmitted with high gain through one of the paths of the coupling system and with relatively low gain through the other path. Means are provided, preferably automatic and responsive to received signals, whereby, as the signal amplitude increases, the gain of the first path is rapidly decreased. Even for relatively strong signals, however, when minimum gain is provided and the path with the steep characteristic is biased beyond the predetermined value, that is, in or beyond the vicinity of its non-linear portion, undesirable overloading effects are minimized or avoided by virtue of the transmission of the signal through the second path which has a substantially linear characteristic and a greater repeating ratio.

In a preferred embodiment of the invention, the coupling system is utilized for coupling an antenna circuit with a first conventional vacuum-tube amplifier of a radio-receiving system. Such a first amplifier tube is, of course, to be distinguished from such repeater tubes as are included in the coupling system, per se, comprising the present invention. Each of the parallel paths may comprise a bias-controlled vacuum-tube transconductance, with the tube of one path having a bias-transconductance characteristic substantially steeper than that of the tube of the other path and substantially non-linear for biases exceeding a predetermined value and preferably being so connected to the input circuit that the signal input thereto is substantially greater than that to the tube of the second path. With this arrangement, the range of signal input amplitudes to the first amplifier tube of the system which may be satisfactorily received is extended to include both very weak and very strong signals; that is, a high signal-to-noise ratio is maintained for all received signals and linearity of transmission is maintained for large received signals. This effective switching from a signal-transmission path of high gain to one of low gain for signal inputs above a predetermined value also increases the effectiveness or range of control of the normal automatic amplification control system.

For a better understanding of the invention, together with other and further objects, reference is had to the following description taken in connection with the accompanying drawing, and its scope will be pointed out in the appended claims. In the accompanying drawing, Fig. 1 is a circuit diagram, partially schematic, of a complete superheterodyne receiver including an antenna coupling system embodying the present invention, while Figs. 2 and 3 are groups of curves illustrating certain operating characteristics of the apparatus of the present invention.

Referring now more particularly to Fig. 1 of the drawing, there is shown a superheterodyne receiver including a coupling system indicated at 10, interconnecting an antenna circuit, comprising an antenna 11 and ground 12, and the input circuit of a radio-frequency amplifier tube 13. Connected in cascade with the radio-frequency amplifier tube 13, in the order named, are an oscillator-modulator 14, an intermediate-frequency amplifier 15, a detector and automatic amplification control or A. V. C. supply 16, an audio-frequency amplifier 17, and a sound reproducer or loudspeaker 18. The A. V. C. supply 16 is connected in conventional manner to the control grids of one or more tubes of the preceding stages of the system, including the tube 13, and tubes of the oscillator-modulator 14 and intermediate-frequency amplifier 15 by way of a lead 26 and filter including a series resistor 26a and shunt condenser 26b. The coupling system 10 together with the parts of the system associated therewith which embody the present invention will be hereinafter described in further detail. It will be understood that the several parts of the receiver which are illustrated in the drawing schematically may be conventional in their construction and operation, the details of which are well understood in the art, rendering description thereof unnecessary.

Neglecting for the moment the particular construction and operation of the parts of the system embodying the present invention, the system described above includes the features of a conventional superheterodyne receiver. The operation of such a receiver being well understood in the art, detailed explanation thereof is deemed unnecessary. In brief, however, a desired modulated-carrier signal is selected and amplified by the antenna coupling system 10 and amplifier tube 13 and converted by the oscillator-modulator 14 to an intermediate-frequency signal. This signal is further selected and amplified by the intermediate-frequency amplifier 15 and translated therefrom to the detector 16 wherein the audio frequencies of modulation are derived. The audio frequencies of modulation are amplified in the audio-frequency amplifier 17 and reproduced in the loudspeaker 18 in conventional manner. The A. V. C. voltage developed by the supply 16 is applied to one or more of the amplifier tubes in the preceding stages of the system in the conventional manner to control the amplification therein inversely in accordance with the received signal amplitude, thereby to maintain the amplitude of the signal output of the intermediate-frequency amplifier within a relatively narrow range for a wide range of signal input amplitudes.

Referring now more particularly to the coupling system 10 embodying the present invention, this system includes a tunable input circuit 19 comprising a winding 23, a radio-frequency by-pass condenser 24 and a tuning condenser 25, and a tunable output circuit 20, similarly comprising a winding 28, a radio-frequency by-pass condenser 29 and a tuning condenser 30. The winding 23 of the input circuit 19 is coupled to a winding 27 included in the antenna circuit 11, 12, while the output circuit 20 is connected to the input electrodes of the amplifier 13. Means are provided for coupling the circuits 19 and 20 comprising two parallel paths including vacuum-tube repeaters 21 and 22, respectively, preferably of the screen grid type.

The input circuit of the vacuum tube 21 is connected across the entire circuit 19, while the input circuit of tube 22 is coupled to the circuit 19 by means of a capacitance voltage divider comprising condensers 33 and 34 connected across the circuit 19. The condenser 33 preferably has a capacitance which is a small fraction of the condenser 34, so that the signal input to the tube 22 is a small fraction of the signal input to the tube 21. The output circuits of the tubes 21, 22 are connected in parallel and coupled to the circuit 20 by a winding 31 inductively related to the winding 28. Operating potentials for the tubes 13, 21 and 22 are applied to their anodes from a suitable source indicated at +B and to their screen grids from suitable sources indicated at +Sc. Biasing resistors 35 and by-pass condensers 36 may be included in the cathode circuits of the tubes in conventional manner.

In order automatically to control the gain of the coupling system 10 in accordance with the amplitude of desired received signals, the signal detector and A. V. C. rectifier 16 comprises a diode 44 coupled to the output of the intermediate-frequency amplifier 15 and is provided with a load circuit including a resistor 45 by-passed by a condenser 46. The automatic amplification control bias for the tube 13 and stages 14 and 15, described above, and the audio frequencies of modulation for the amplifier are derived from the load resistor 45 in a conventional manner.

The unidirectional voltage developed across the resistor 45 is applied by way of a lead 54, a suitable filter including series resistor 55 and shunt condenser 56, and the winding 23 to the control grid of the tube 21 to control the gain thereof, in the conventional manner, in accordance with the amplitude of the desired signal input to the system. In order to control the gain of the tube 21 also in accordance with interfering received signals, there is provided an auxiliary diode 49 coupled to the output of the coupling system 10, which is broadly selective, through a coupling condenser 50 and provided with a load circuit including resistors 57, 55 and 45. Thus, the unidirectional voltages developed by both of the rectifiers 44 and 49 are applied to the control grid of the tube 21 and the gain of the tube 21 is controlled jointly by both the desired signals and the interference value of adjacent undesired signals. It will be understood that interference caused by an adjacent signal is dependent upon its proximity to the selected desired signal as well as its amplitude at the location of the receiver, and the term "interference value" is employed herein to define undesired signals with reference to both of these aspects.

A portion of the unidirectional voltage developed across the load resistor 45 is supplied from an intermediate tap on this resistor through a lead 58 including a filter comprising a series resistor 59 and the shunt condenser 34 to the control grid of the tube 22 to control the gain of this tube in accordance with the desired signal amplitude. Due to the fact that only a fraction of the A. V. C. bias voltage is applied to tube 22 while the entire A. V. C. voltage is applied to the tube 21, the control bias of tube 22 varies at a lesser rate with respect to received signal intensity and over a more limited range than the control bias of the tube 21.

As an alternative to the automatic biasing means described above, manual control apparatus indicated generally at 60 may be provided. This apparatus may comprise a voltage divider resistor 61 connected across a battery 62 and provided with an adjustable tap 63 arranged to be selectively connected to the control grids of the tubes 21 and 22 by means of a switch 64.

The general operation of the coupling system may best be described with reference to the curves of Figs. 2 and 3, wherein the abscissae represents bias voltages developed across the resistor 45 and applied to the control grids of the tubes 21 and 22, and the ordinates represent relative gain of the tubes, in decibels. The curves A and B of Fig. 2 represent the characteristics of tubes 21 and 22, respectively, if full A. V. C. bias were applied to both. It will be seen that curve A is relatively steep throughout the major portion thereof and has a sharp lower cutoff portion, while the entire curve B is of gradual slope and free from portions of sharp curvature, this resulting from the fact that the tube 21 has a steep bias-transconductance characteristic and is of the sharp cut-off type while the tube 22 has a gradual characteristic, preferably being of the variable-mu or remote cut-off type.

Since, as described above, the control of the tubes 21 and 22 is at different rates with respect to signal input amplitude, or over different ranges, the characteristic of the tube 22, if full signal input voltage were applied from the circuit 19, is that illustrated by the curve B₁ of Fig. 2. However, since the input circuit of the tube 22 is coupled to receive only a fraction of the signal input voltage across circuit 19, the actual relative gains of the two paths of the coupling system for any given received signal are illustrated by the curves A and B₂ of Fig. 3. The over-all gain characteristic for the coupling system 10 is then generally illustrated by the curve C of Fig. 3, which represents the sum of the curves A and B₂. It will, of course, be understood that the over-all gain characteristic will be somewhat modified by the action of the rectifier 49 which, as described above, also provides A. V. C. bias voltage for the tube 21 in accordance with the amplitude of both the desired and undesired signals.

In considering the operation of the system described above, it will be assumed that a weak signal is being received. Under this condition, little or no A. V. C. bias voltage is developed by the rectifier 16, and tubes 21 and 22 operate with maximum signal-translating efficiency so that both paths of the coupling system transmit the signal with maximum gain, although the path including the tube 21 is primarily effective under such conditions as shown by the right-hand portion of the curves of Fig. 3. As signals of intion creased amplitude are received, however, increasingly greater bias voltages are developed and applied to the coupling tubes and the gain or transmission efficiency of the path including the tube 21 decreases rapidly, as represented by the steep portion of the curve A. Inasmuch as the greater portion of the total gain of the system is due to this path, over-all gain of the coupling system likewise decreases rapidly. It will be apparent that, if the coupling system included this path only, for a sufficiently strong signal, a bias voltage would be developed such as to cause the operation over the non-linear or cut-off portion of curve A, resulting in overloading of the tube and consequent distortion of the desired signal and cross-modulation thereof with adjacent undesired signals. However, when receiving a signal having such high amplitude that the tube 21 is biased near or beyond cutoff, the greater portion of the gain of the system is due to the path including the tube 22 which, as mentioned above, has a repeating characteristic for all operating conditions which is substantially linear, thereby avoiding distortion. Further, the fraction of the signal input to the tube 22 is sufficiently small that it will not overload even for excessively strong signals, thereby avoiding cross-modulation. Hence, the present invention provides an arrangement whereby the advantage of high gain for relatively weak signals is obtained, while for relatively strong signals the required signal translation is obtained without appreciable undesirable distortion or overloading effects, to the end that a high signal-to-noise ratio at the input of the amplifier tube 13 is obtained for all conditions of reception. At the same time, the range of control of the automatic amplification control system is materially extended. While in the system illustrated and described above, both of the signal-repeating paths are adjustably biased to vary their transmission efficiencies, when the signal input to the path having the lower transmission efficiency is attenuated, the bias on such path may, if desired, be fixed at a suitable value.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a signal-translating system, a coupling system comprising an input circuit, an output circuit, at least two parallel bias-controlled signal-repeating paths coupling said circuits, one of said paths having a bias-transmission efficiency characteristic substantially steeper than that of the other path and substantially non-linear for biases in excess of a predetermined value, the other of said paths having a bias-transmission efficiency characteristic varying gradually over its entire range and substantially linear for all operating conditions, and means for biasing said paths to vary their signal-transmission efficiencies, the bias applied to said one of said paths extending over a range including said predetermined value.

2. In a signal-translating system, a coupling system comprising an input circuit, an output circuit, at least two parallel paths coupling said circuits each including a bias-controlled signal-repeating device, one of said devices having a bias-transconductance characteristic substantially steeper than that of the other device and substantially non-linear for biases in excess of a predetermined value, the other of said paths having a bias-transmission efficiency characteristic varying gradually over its entire range and substantially linear for all operating conditions, and means for biasing said devices to adjust the gain of said devices, the bias applied to said one of said devices extending over a range including said predetermined value.

3. In a signal-translating system, a coupling system comprising an input circuit, an output circuit, at least two parallel paths coupling said circuits each including a bias-controlled vacuum tube, one of said tubes having a steep bias-transconductance characteristic and being of the sharp cut-off type and the other of said tubes being of the variable-mu remote cut-off type, and means for biasing said tubes to adjust the gain thereof, the bias applied to said one of said tubes extending over a range including the cut-off thereof.

4. In a signal-translating system, a coupling system comprising an input circuit, an output circuit, at least two parallel paths coupling said circuits each including a bias-controlled vacuum tube, one of said tubes having a bias-transconductance characteristic substantially steeper than that of the other tube and substantially non-linear for biases in excess of a predetermined value and the other of said tubes being of the variable-mu remote cut-off type, the space current paths of said tubes being coupled effectively in parallel to said output circuit, and means for biasing said devices to adjust the gain thereof the bias applied to said one of said tubes extending over a range including said predetermined value.

5. In a signal-translating system, a coupling system comprising an input circuit, an output circuit, at least two parallel bias-controlled signal-repeating paths coupling said circuits, one of said paths having a bias-transmission efficiency characteristic substantially steeper than that of the other path and substantially non-linear for biases in excess of a predetermined value, the other of said paths having a bias-transmission efficiency characteristic varying gradually over its entire range and substantially linear for all operating conditions, and means for biasing said one of said paths over a predetermined range including said predetermined value and for biasing the other of said paths over a different predetermined range to vary the signal-transmission efficiency thereof.

6. In a signal-translating system, a coupling system for transmitting a desired modulated-carrier signal comprising an input circuit, an output circuit, at least two parallel bias-controlled signal-repeating paths coupling said circuits, one of said paths having a bias-transmission efficiency characteristic substantially steeper than that of the other path and substantially non-linear for biases in excess of a predetermined value, the other of said paths having a bias-transmission efficiency characteristic varying gradually over its entire range and substantially linear for all operating conditions, and means for biasing said one of said paths in accordance with the amplitude of the desired signal input to said system and over a predetermined range including said predetermined value and for biasing the other of said paths in accordance with the amplitude of said desired signal input over a different predetermined range, to vary the signal-transmission efficiencies of said paths inversely in accordance with said desired signal amplitude.

7. In a signal-translating system, a coupling system for transmitting a desired modulated-carrier signal comprising an input circuit, an output circuit, at least two parallel bias-controlled signal-repeating paths coupling said circuits, one of said paths having a bias-transmission efficiency characteristic substantially steeper than that of the other path and substantially non-linear for biases in excess of a predetermined value, means for biasing said one of said paths over a predetermined range including said predetermined value and in accordance with the amplitude of the desired signal input to said system and the interference value of an undesired signal on a frequency near the carrier frequency of the desired signal, and means for biasing said other path over a different predetermined range and in accordance with the amplitude of said desired signal.

8. In a signal-translating system, a coupling system comprising an input circuit, an output circuit, at least two parallel bias-controlled signal-repeating paths coupling said circuits, the couplings between said input circuit and said paths being so proportioned that the signal input to one of said paths is substantially greater than that to the other path, said one of said paths having a bias-transmission efficiency characteristic substantially steeper than that of the other path and substantially non-linear for biases in excess of a predetermined value, and means for biasing said paths to vary their signal-transmission efficiencies, the bias applied to said one of said paths extending over a range including said predetermined value.

9. In a signal-translating system, a coupling system comprising an input circuit, an output circuit, at least two parallel paths coupling said circuits each including a bias-controlled signal-repeating device, the coupling between the said input circuit and said devices being so proportioned that the signal input to the device of one of said paths is substantially greater than the signal input to the device of the other of said paths, the device of said one of said paths having a bias-transconductance characteristic substantially steeper than that of the device of said other path and substantially non-linear for biases in excess of a predetermined value, and means for biasing said devices to adjust the gain of said devices, the bias applied to the device of said one of said paths extending over a range including said predetermined value.

10. In a signal-translating system, a coupling system comprising an input circuit, an output circuit, at least two parallel paths coupling said circuits each including a bias-controlled signal-repeating device, the coupling between said input circuit and said paths being so proportioned that the signal input to one of said paths is substantially greater than that to the other of said paths, the device in said one of said paths having a gain bias characteristic substantially steeper than that of the device of the other path and substantially non-linear for biases in excess of a predetermined value, and means for biasing said device in said one of said paths as a predetermined function of the signal input amplitude and over a range including said predetermined value and for biasing the other of said devices at a lesser rate than that of said devices in said one of said paths.

11. In a signal-translating system, a coupling system comprising an input circuit, an output circuit, at least two parallel bias-controlled signal-repeating paths coupling said circuits, the coupling between said input circuit and said paths being so proportioned that the signal input to one of said paths is substantially greater than that to the other of said paths, said one of said paths having a bias-transmission efficiency characteristic substantially steeper than that of the other path and substantially non-linear for biases in excess of a predetermined value, and means for biasing said one of said paths over a predetermined range including said predetermined value and for biasing the other of said paths over a different predetermined range to vary the signal-transmission efficiencies thereof.

12. In a signal-translating system, a coupling system comprising an input circuit, an output circuit, at least two parallel signal-repeating paths coupling said circuits, the coupling between said input circuit and said paths being so proportioned that the signal input to one of said paths is substantially greater than that to the other of said paths, said one of said paths being bias-controlled and having a steep bias-transmission efficiency characteristic which is substantially non-linear for biases in excess of a predetermined value and the other of said paths having a repeating characteristic substantially linear for all operating conditions and substantially greater than that of said one of said paths when biased to said predetermined value, and means for biasing said one of said paths over a range including said predetermined value to vary its signal-transmission efficiency.

ALFRED W. BARBER.